United States Patent [19]

Sheine

[11] 4,133,552
[45] Jan. 9, 1979

[54] CONTROL MEANS FOR A VEHICULAR TRACTOR-TRAILER CONNECTION

[76] Inventor: Gerald Sheine, Old Mill River Rd., Pound Ridge, N.Y. 10576

[21] Appl. No.: 806,861

[22] Filed: Jun. 15, 1977

[51] Int. Cl.$^2$ .............................................. B60D 1/00
[52] U.S. Cl. ................................ 280/446 B; 172/272; 280/479 R; 280/DIG. 14
[58] Field of Search ............... 280/479 R, 477, 478 R, 280/446 B, 446 R, DIG. 9, DIG. 14; 172/272, 273, 274; 180/139, 11, 12, 13

[56] References Cited

U.S. PATENT DOCUMENTS

| 2,532,151 | 11/1950 | Dibert et al. | 280/DIG. 9 |
| 3,368,292 | 2/1968 | Prinoth | 280/DIG. 9 |
| 3,834,480 | 9/1974 | McGee | 280/DIG. 9 |

FOREIGN PATENT DOCUMENTS

| 2248695 | 5/1975 | France | 280/446 B |
| 478247 | 2/1953 | Italy | 280/446 B |

Primary Examiner—John A. Pekar
Attorney, Agent, or Firm—Hopgood, Calimafde, Kalil, Blaustein & Lieberman

[57] ABSTRACT

The invention contemplates pressure-fluid operated control connections, auxiliary to a trailer-hitch connection, for providing a selected one of a plurality of functions primarily to aid in making a hitched connection between a trailer and a towing vehicle. The invention also provides selective availability of safety aids for back-up maneuvering of the hitched trailer, and anti-sway coupling for the safe trailing of hitched vehicles on the highway. Various embodiments are described.

14 Claims, 6 Drawing Figures

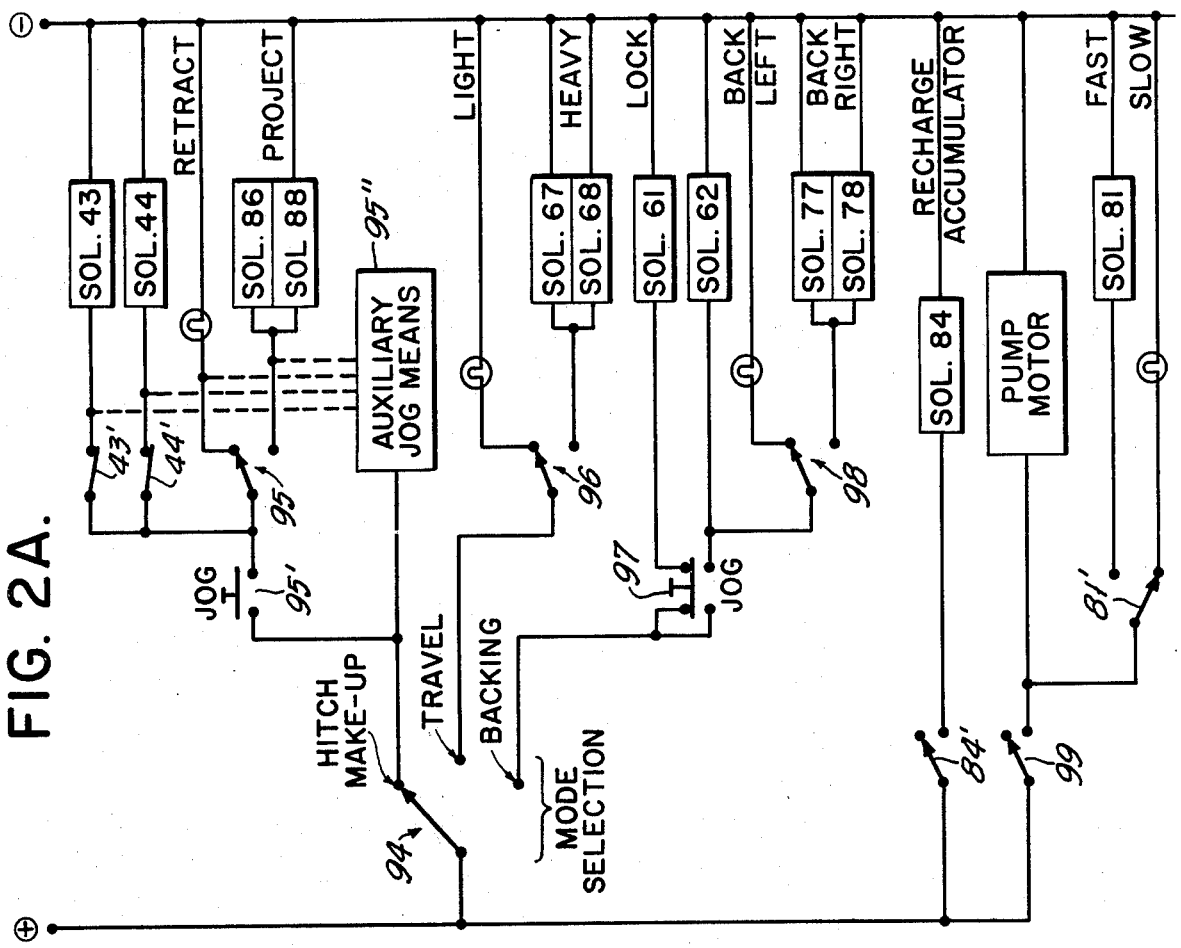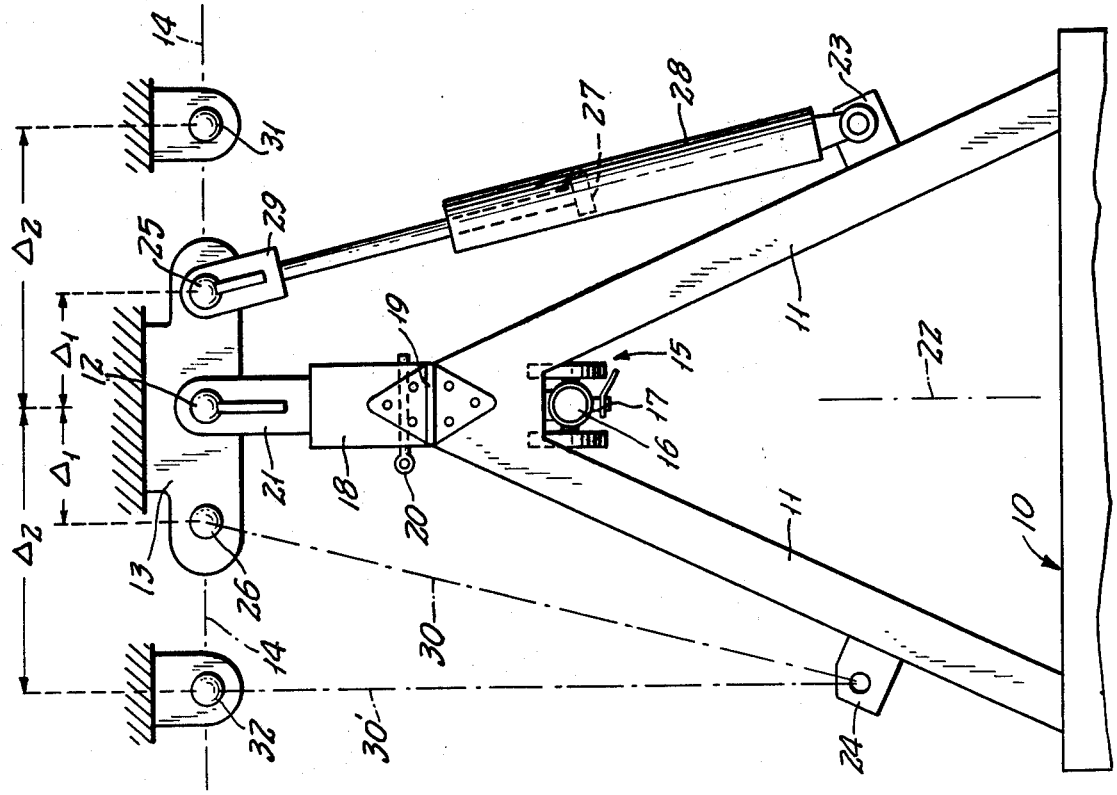

ON TOWED VEHICLE

ON TOWING VEHICLE

CONTROL MEANS FOR A VEHICULAR TRACTOR-TRAILER CONNECTION

My invention relates to pressure-fluid operated mechanism providing removable auxiliary connection between a towing vehicle and a towed vehicle, whereby the making of a hitched connection is accomplished with relative ease.

For vehicular trailers of less than commercial-trucking sizes, the making of a proper hitched connection to a towing vehicle is not a simple process, particularly for the non-professional who has only intermittent occasions on which to make his hitched connections. For example, recreational trailers, loaded boat trailers and the like are too heavy to be managed solely by backbone and muscle, and I am unaware of any satisfactory mechanism to aid in establishing a hitched connection of the trailer to its towing vehicle.

It is accordingly an object of the invention to provide improved trailer-connection mechanism which incorporates means to aid in establishing the hitched connection.

It is also an object to provide such mechanism using fluid-pressure operated means.

Another object is to achieve the above objects with components which also provide safety features and maneuvering functions to aid in back-up and highway travel of the connected trailer.

A specific object is to achieve the above objects with remotely controlable mechanism, with at least the feature of remote controlability from the driver's position in the towing vehicle.

Another specific object is to provide a set of components which is readily removably adaptable to existing vehicles to achieve above-stated objects.

A general object is to achieve the foregoing objects with readily available existing components, to produce a simple and relatively foolproof construction which can be installed and operated by relatively unskilled persons and with virtually no physical effort.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is a simplified plan view of trailer and towing-vehicle parts, served by auxiliary connection mechanism of the invention;

FIGS. 2 and 2A are, respectively, hydraulic and electrical circuit diagrams schematically depicting control and actuating elements used with parts shown in FIG. 1.

Figure 2:
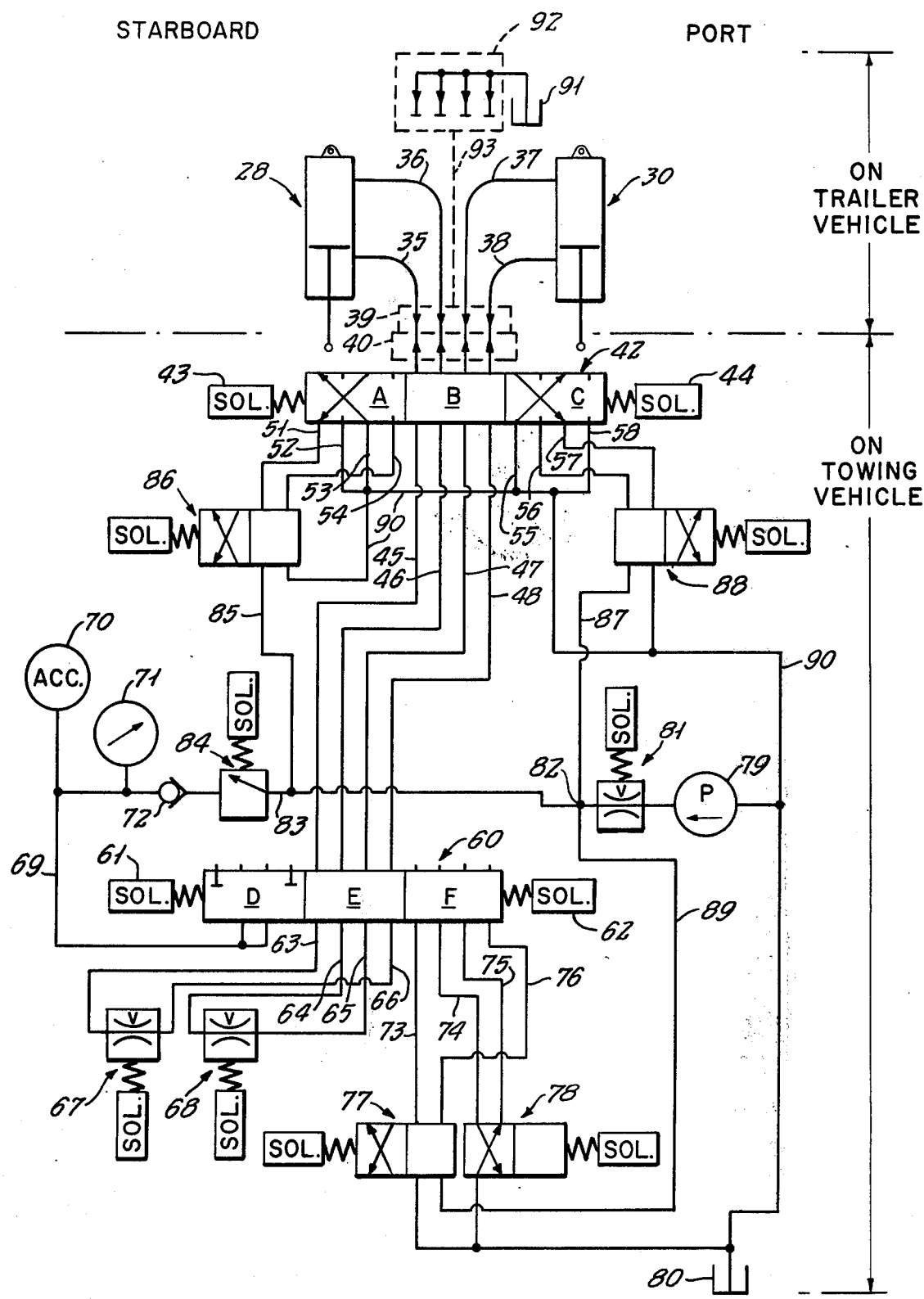

Briefly stated, the invention contemplates removable connection of two auxiliary links between a trailer and its towing vehicle, the links being of selectively controlable length and disposed on opposite sides of the trailer tongue and its usual hitch connection to the towing vehicle. The controlable length of these links is provided by telescoping piston and cylinder elements, and a variety of useful functions result from the selective provision of particular pressure-fluid connections to and between the cylinder elements.

In FIG. 1, the invention is shown in application to a trailing vehicle 10 having rigid tongue or frame structure 11 to be removably connected, as to a tow-hitch ball 12 on a transverse bar or other frame structure 13 of a towing vehicle 14, the latter being symbolized by a heavy phantom line which will be understood to represent a transverse alignment of the towing vehicle frame, centered at the tow-hitch ball 12. In the form shown, the trailer tongue 11 provides a triangular frame having a retractable dolly 15 at the forwardly projecting end of the frame, and it will be understood that the dolly suspension from the frame 11 includes a jack-screw or other elevating mechanism 16, having a manually operated removable-tool fitting 17. The trailer tongue further includes a towing-tongue extension 18 having a horizontal hinge-axis connection 19 to the rigid triangular frame, it being understood that upon transverse insertion and removal of a pin 20 offset from the hinge axis 19, the tongue extension 18 may be locked in its forwardly projecting (towing) position and that, upon removal of pin 20, the extension 18 may be elevated about the hinge axis 19. At its forward end, the extension 18 carries a hitch fitting 21 having removable pivoted connection to the hitch ball 12.

In accordance with the invention, extendable link connections are additionally provided at opposite lateral offsets from the axis 22 of towing symmetry, between trailer-based connection brackets 23-24 and towing-vehicle connection points 25-26, as on the towing bar or frame member 13. The lower link is shown to comprise piston (27) and cylinder (28) elements which are double-acting, the cylinder element 28 being pivotally connected to bracket 23, and piston element 27 being removably and pivotally connected by ball and socket hitch members at 25-29. For the symmetrically aligned towing relation shown in FIG. 1, the piston element 27 is generally centrally positioned along the length of cylinder element 28, to allow for fully steered articulation of the towing connections. It will be understood that on the other side, a second and similar double-acting extendable link connects the bracket 24 to the towing point 26, such similar link being merely symbolized by a phantom line 30.

To complete the description of FIG. 1, it is noted that link-connection points 25-26 are at like but relatively short offsets Δ1 from the central towing axis 22, at ball 12; this relationship permits a single towing bar or bracket 13 to serve all three tow-connection points 12-25-26, and this will be found to be satisfactory for most towed-vehicle situations. However, for more massive trailers, FIG. 1 further suggests at 31-32 the provision of more widely offset link-connection points on the towing vehicle, the greater offset being denoted Δ2 and representing alternative towing-vehicle frame connections for the piston-hitch members 29, as on the alignment 30' for link means 30, particularly for use in backing-mode operations, to be described.

FIG. 2 schematically shows hydraulic-circuit connections for operation of the described double-acting link devices 28-30 of FIG. 1. As will be seen from descriptive legends, most of the pressure-fluid supply and control mechanism is mounted on the towing vehicle, the hydraulic equipment on the trailer behicle being essentially limited to the double-acting devices 28-30 and to independent flexible conduit connection lines 35-36-37-38, between the head and tail ends of devicces 28-30 and detachable-connection means 39. The connection means 39 provides detachable connection to corresponding means 40 mounted on the towing vehicle. The net result is that, via detachable-connection means 39-40, the independent integrity of conduit lines 35-36-37-38 is maintained to the outlet side of the body of a selector valve 42 carried by the towing vehicle.

Selector valve 42 is shown as a spool valve which is normally spring-biased to its centrally operative position, placing its central spool segment B in position for independent connection of lines 35-36-37-38 to lines 45-46-47-48, respectively; in this central position, valve 42 is set for the TRAVEL mode of operatively connecting the double-acting elements 28-30, as will later be more fully explained. Valve 42 is to be understood as comprising two spools, independently actuable by separate solenoids 43-44, and thus providing four states of establishing differently selected connection relationships for the conduit lines 35-36-37-38. The first of these different relationships has already been described, namely for the spring-centered condition in which solenoids 43-44 are not actuated. In a second relation of valve (42) connections, pursuant to actuation by solenoid 43, a left-end spool segment A is placed in position for connection of conduit lines 35-36-37-38 to lines 51-52-53-54, wherein cross-over passages in spool section A interconnect conduits 35-53 and conduits 37-51, leaving the aligned connection of conduits 36-52 and 38-54; in this A selected operation, the described section B connections are no longer operative, and the first of the two spools of valve 42 is set to operate means 30, for a first optional phase of the "HITCH MAKE-UP" mode of operatively connecting the double-acting elements 28-30, as will also later be more fully explained. In a third relation of valve (42) connections, pursuant to actuation by solenoid 44, a right-end spool segment C is placed in position for connection of conduit lines 35-36-37-38 to lines 55-56-57-58, wherein cross-over passages in spool-section C interconnect conduits 35-57 and conduits 37-55, leaving the aligned connection of conduits 36-56 and 38-58; in this C-selected operation, the described section B connections are no longer operative, and valve 42 is set to operate means 28, for a second optional phase of the "HITCH MAKE-UP" mode of operatively connecting the double-acting elements 28-30. Finally, in the fourth relation of valve (42) connections, both solenoids 43-44 are actuated, to render the described A-section and C-setion connections operative, and the B-section connections inoperative, again for "HITCH MAKE-UP" purposes to be later discussed.

Basic mode selection for operation of the circuit of FIG. 2 relies upon a further multiple-position selector valve 60 which may be of the general variety described in connection with valve 42. Thus, valve 60 has two spools, independently actuable by separate solenoids 61-62, and providing four states of establishing differently selected connection relationships for conduit lines 45-46-47-48.

For the first of these relationships of valve 60, the central section E is positioned to connect these 45-46-47-48 to corresponding further lines 63-64-65-65. The outer two (63-66) of these thus-connected lines are interconnected via first solenoid-operated throttling-orifice valve means 67, and the inner two (64-65) of these thus-connected lines are interconnected via second solenoid-operated throttling-orifice valve means 68. The symbolism for valves 67-68 is intended to indicate that in their normal unactuated states they place first like restrictive orifices in interconnected lines 63-66 and 64-65, respectively, and that in their solenoid-actuated states, valves 67-68 place second like (e.g., smaller) restrictive orifices in lines 63-66 and 64-65, respectively. Thus, for valve 42 in its B-operative (central) condition and for valve 60 in its E-operative (central) condition, valve 67 provides a restrictive-orifice connection between the tail ends of the double-acting means 28-30, while valve 68 provides a restrictive-orifice connection between the tail ends of means 28-30; and the actuation or not of solenoids for valves 67-68 determine whether and to what extent the size of the orifice restrictions in such connections is changed.

For solenoid-61 actuation of valve 60, the D section is operative is connect lines 45-48 to stops and to interconnect lines 46-47 in a single line 69 to an accumulator 70 and associated pressure indicator 71, flow in line 69 being otherwise blocked by a check valve 72 which is used when recharging the accumulator 70, as will later be more fully explained. Again, it will be understood that solenoid actuation for either of the spools of valve 60 is operative to effectively block the described E-section connections.

For solenoid-62 actuation of valve 60, the F-section is operative to connect lines 45-46-47-48 to corresponding lines 73-74-75-76 associated with flow-reversing solenoid valves 77-78 in the pumped-fluid circuit, between pumping means 79 and a sump 80. The pumping means 79 may be power driven by an electric motor or by a power take-off connection to the motor of the towing vehicle, or otherwise, and the provision of solenoid-operated restrictive-orifice valve means 81 will be understood to suggest solenoid-operated selection of a desired one of at least two different flow rates for pumped-fluid delivery to an outlet junction 82.

In FIG. 2, one or more of four different distribution lines is selectively available for various of the controlled operations of the system. In a first line 83, a solenoid-operated valve 82 is actuable, when desired, to supply replenishment fluid via check-valve 72 to the accumulator 70. In a second line 85 to a flow-reversing solenoid valve 86 serving lines 51-52-53-54, pressure fluid is reversibly delivered to the respective ends of cylinder 30, when solenoid 43 is actuated to place valve 42 in its A-operative condition; similarly, in a third line 87 to a flow-reversing solenoid valve 88 serving lines 55-56-57-58, pressure fluid is reversibly delivered to the respective ends of cylinder 28, when solenoid 43 is actuated to place valve 42 in its C-operative condition. In both the A and C connected situations just mentioned, a recirculation or sump-return system of lines 90 returns displacement-expelled fluid from the unactuated ends of cylinders 28-30 to pump 79 (for recirculation) or to sump 80 for accumulation, as the instanteneous circumstances may require. In the fourth line 89, pumped pressure fluid is deliverable via valve 77 to the tail end of one to the exclusion of the other of cylinders 28-30, whenever solenoid 62 is actuated, and the particular cylinder receiving such flow depends upon when the solenoid of valve 77 is or is not energized; valve 78 coordinates with valve 77 to accommodate piston-displaced flows to sump 80.

To complete the description of parts in FIG. 2, the trailer-borne equipment is shown to include a pan or sump 91 and manifold 92 for collection of displacement-expelled fluid from cylinders 28-30, in the circumstance of piston displacement when the coupling means 39-40 is detached. To this end, the detachable-connection means 39 will be understood to include mechanical means (suggested at 93) which is actuable to connect all the cylinder lines 35-36-37-38 to the manifold 92 whenever the coupling means 39-40 is detached.

Operation of the described system of FIGS. 1 and 2 will be better understood from a discussion involving each of the various available modes of use, to which only brief allusion has thus far been made.

HITCH MAKE-UP Mode

Starting with the situation in which the trailer vehicle is parked by itself and is to be connected to the towing vehicle, a first or HITCH MAKE-UP mode of the invention will first be described, for coupling of the trailer and towing vehicles. In its parked condition, the trailer brakes will have been set, and the forward end of the trailer will be supported at tongue 11 by the dolly jack 16; the trailer's hydraulic system comprises cylinders 28-30 connected via lines 35-36-37-38 to the manifold 92, with collection pan 91 open to the atmosphere. The following procedural steps are then undertaken:

1. Remove pin 20 to unlock the tongue extension 18, and raise the same to a vertical position about the hinge axis 19.

2. Push both port (30) and starboard (28) cylinder links to their fully retracted position, thus discharging fluid from the head ends of cylinders 28-30, into the collection pan or reservoir 91.

3. Back the towing vehicle toward the parked trailer, parking and setting the brakes of the towing vehicle when the hitch ball 12 is within range of establishing a hitched connection. For a typical automobile set-up, the locating tolerance is about plus or minus one foot, meaning that the ball 12 should be within a rectangle which is about 2 feet in the length direction of the trailer, which is about 16 inches in the lateral direction, and which is centered on the trailable ball-socket locus of hitch member 21, i.e., the ball-socket locus when tongue extension 18 is in its lowered position, secured by pin 20.

4. The port (30) and starboard (28) cylinder links should then be pulled to extend them to the length necessary for attachment to the inboard connection points 25-26.

5. The trailer brakes may then be released and the towing vehicle may be driven slowly forward, to allow links 28-30 to extend fully and to draw the trailer into alignment with the towing vehicle, whereupon the towing vehicle brakes should be set, if on level ground or on an upgrade; if on the down grade, the trailer brakes should be set to the exclusion of the towing-vehicle brakes.

6. The hydraulic coupling at 39-40 should next be established, while at the same time disabling the drainage connection of lines 35-36-37-38 to manifold 92.

7. Start pump 79, and energize solenoids 43-44-86-88, thus pumping pressure fluid to the tail ends of cylinders 28-30; the piston rods of cylinders 28-30 are thus retracted in unison, and the retraction should be continued until achieving the "hitch" position, engraved or otherwise marked on the piston rods. The indicated solenoids being de-energized to stop the retracting displacement. The trailer and towing vehicles are now in alignment and at the proper distance for completing the "make-up", allowing the hitch extension 18-21 to be lowered for coupling to the hitch ball 12.

8. If necessary, level the hitch extension 18-21 and trailer tongue 11, using the dolly jack 16, and then insert the locking pin 20. The front-end load of the trailer may now be sustained by the towing vehicle, upon jack retraction of the dolly 15.

9. Upon release of all brakes, the connected vehicles may now be driven off, it being noted that upon de-energizing of solenoids 43-44-86-88 (and with solenoids 61-62 not energized) the hydraulic connections to cylinders 28-30 are determined by centraal sections B and E of valves 42 and 60, respectively. In this circumstance, it will be recalled that restrictive orifices at 67-68 provide stabilizing anti-sway action, characteristic of use of the TRAVEL mode, discussed below.

BACK-UP Mode

The BACK-UP mode will be discussed on the assumption that the towing and towed vehicles are coupled and in the TRAVEL mode condition described above at Item 9 of the HITCH MAKE-UP procedure. For the BACK-UP mode, the following additional steps are recommended:

10. Move the extendable-link connections from the inboard connection points 25-26 to the outboard connection points 31-32. This may or may not require a slight shortening of the links 28-30, which may be accommodated by briefly actuated connection of manifold 92 to the cylinder lines 35-36-37-38, and after making the outboard connections at 31-32 the manifold 92 should be actuated by means 93 to effectively disconnect the same. Of course, it will be understood that if the inboard and outboard connection points 25-31 and 26-32 are respectively at inboard and outboard ends of a slotted path for single port and starboard connecting balls, the change from inboard to outboard-based connections may be accomplished by sliding the single connecting balls in their respective slots, the same being clamped in the inboard or the outboard position, as desired.

11. If, in backing the hitched vehicles, it is desired to maintain a locked (i.e., non-pivotable) relationship, as for example to hold the trailer and the towing vehicle in a straight and aligned relation, solenoid 61 is actuated to place section D of valve 60 in its lock-determining position, wherein what had (in the TRAVEL mode) been orifice-restricted flow-resisting or stabilizing action between head ends of cylinders 28-30 and between tail ends of cylinders 28-30, becomes a total shut-off of such flows and therefore a lock-up of whatever alignment existed at the time of energizing solenoid 61. It will be understood that upon backing the locked-up system, the trailer is virtually rigidly united to the towing vehicle. If the locked alignment is straight, then the trailer axle (rather than the rear axle of the towing vehicle) becomes the reference point for any steering effort at the front axle of the towing vehicle. And of course if the locked relation involves misalignment of the longitudinal axes of the towing and towed vehicles, then a curved path or backing turn is indicated; but the turn will be at a constant rate, assuring against any inadvertent jack-knifing, and enabling vastly simplified back-up steering.

12. If, in backing the hitched vehicles, it is desired to vary the longitudinal-axis alignment of the towed and towing vehicles, backing may be commenced slowly as in the locked condition described at Item 11 above; then, with or without excitation of solenoids 77-78, valve 60 may be shifted from solenoid 61 actuation to solenoid 62 actuation, to deliver pressure fluid to the desired end of one of the cylinders 28-30. In this circumstance, with solenoids 77-78 not energized, pressure-fluid flow is distributed to the tail end of cylinder 30, causing a counterclockwise steering movement between towed and towing vehicles, about the tow-hitch point 12; with solenoids 77–78 energized, pressure-fluid flow is distributed to the tail end of cylinder 28, causing an opposite or clockwise steering moment about point 12. I call this counterclockwise moment a "leftward" steering because it is viewed in a backing operation; similarly, I view the clockwise moment associated with excitation of solenoids 77–78 as calling for "rightward" steering of the backing vehicles. Once the foregoing steering or change of turn is observed, the locked-vehicle condition may be re-established to hold the new alignment, merely by de-energizing solenoid 62 and re-actuating the locking solenoid 61.

TRAVEL Mode

Establishment of the TRAVEL mode has already been described and established at Item 9 above, the same being characterized by restrictive-orifice impedance in the connection of head ends and in the connection of tail ends of the double-acting devices 28–30. Under normal conditions of road surface, travel speed, and trailer loading, the first-described orifice restrictions at 67–68 should provide correct sway-damping or stabilizing action, for the unactuated condition of solenoid valves 67–68. For more severe conditions, tighter stabilizing action may call for use of the smaller orifices which are operative when solenoids at 67–68 are energized. Of course, it will be understood that in the preferred form, valves 67–68 are of the variety which enable selective adjustment of orifice settings; for example, such valves enable adjustment of the orifice size which will be applicable for normal travel conditions (solenoids not actuated), and such valves also enable adjustment of the smaller orifice size which will be applicable for the unusual or heavy-duty conditions in which solenoids should be actuated at 67–68.

ELECTRICAL CONTROLS

From the foregoing, it should be clear that each of the solenoids can be individually controlled to achieve indicated results and relationships. It is, however, helpful to simplify electrical control, and the ladder diagram of FIG. 2A illustrates electrical simplifications to operate the hydraulic circuit of FIG. 2.

In FIG. 2A, a first selector switch 94 enables a basic decision involved in selection of (a) the HITCH MAKE-UP mode, the TRAVEL mode and (c) the BACKING mode. For a HITCH MAKE-UP selection at switch 94, a secondary switch 95 enables selection of projecting or retracting displacement of cylinders 28–30, a jogging switch 95' being available to enable small displacements at any given time, and normally closed switches 43'–44' being actuable to selectively disable the circuit to one or the other of solenoids 43–44 to enable jogging of a selected one to the exclusion of the other of solenoids 43–44.

For TRAVEL-mode selection at 95, a secondary switch 96 enables selection of the light or heavy duty orifice connections, described for the respective de-energized and energized states of solenoids 67–68.

For BACKING-mode selection at 94, a double-throw jogging switch 97, normally biased to call for locking action via solenoid 61, is depressable to disable the locked condition and to substitute right or left backing steering action, with the direction selected at a further secondary selector switch 98.

Beyond the mode-selection connections noted, FIG. 2A also shows a switch 84' for such temporary operation of solenoid 84 as to recharge the accumulator, and a switch 99 for running the motor of pump 79. In the latter connection, a secondary selector switch enables fast or slow pumped-fluid delivery, depending upon whether solenoid 81 is operated.

It should be noted that for the embodiment of FIGS. 2 and 2A, all electrical controls are at least provided for driver access in the towing vehicle. And to assist in HITCH MAKE-UP operations, it is preferred that an independent control box or panel be provided with duplicate switches 43'-44'-95-95' (in their connections to solenoids 43-44-86-88) as suggested by dashed-line connections to auxiliary jogging control means 95"; such duplicate means 95" is preferably conveniently accessible at the rear of the towing vehicle, as upon raising the trunk lid of a passenger car. Specifically, with the duplicate jogging means 95" accessible in the region of establishing a HITCH-UP between the towing and trailing vehicles, the ability exists to jog each cylinder 28 (30) independently so as to enable the cylinder (28) connection 25 to be made before making the cylinder (30) connection 26; having made these connections, the tongue extension 21 may be improperly positioned but the positioning can be corrected, without need to drive the towing vehicle, merely by observing correctional repositioning achieved by selective drive of one cylinder 28 (30) at a time and in the direction governed by choice at 43'–44' (within means 95").

FURTHER EMBODIMENTS

Figure 3:
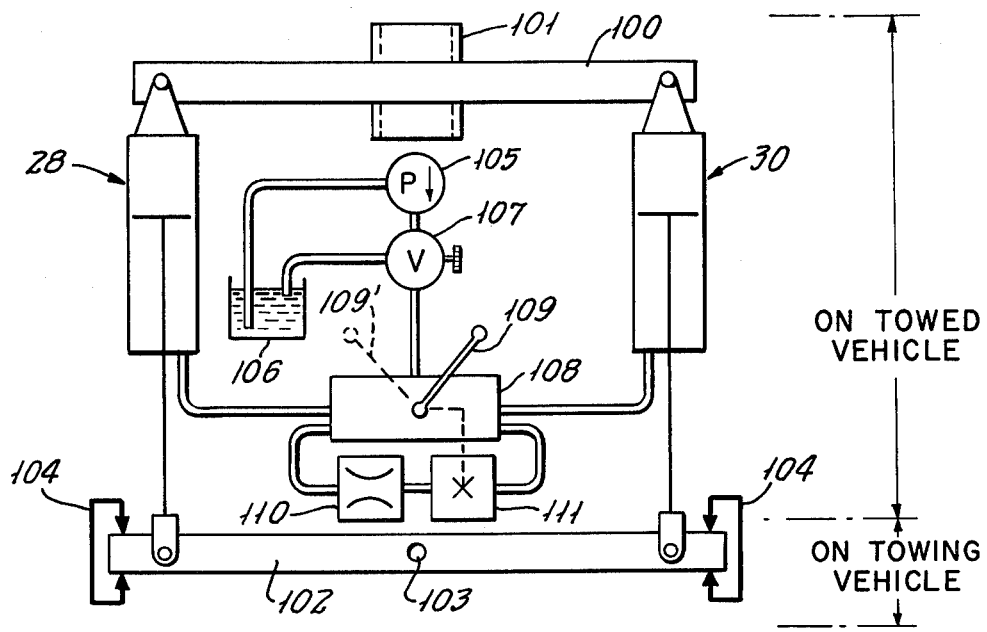
FIGS. 3, 4 and 5 are simplified diagrams schematically depicting further embodiments of the invention.

The embodiment of FIG. 3 represents substantial simplification of the apparatus already described, but will be seen to provide a number of the same or similar functions, with all hydraulic components and functions being trailer-based. In FIG. 3, the conventional tongue-hitch and ball connections (21–12, in FIG. 1) are assumed and are therefore not repeated, so that FIG. 3 shows only mechanical connection of hydraulic elements, of which the extensible-link means 28–30 will be recognized from previous description; however, in the simplified form shown, the devices 28–30 are only single-acting, as will later be more clear. Further, FIG. 3 shows the parts as an assembled or readily assembled subassembly which is capable of removable attachment to the towing and towed vehicles. Thus, a cross-beam 100 is equipped with a central bracket 101 which will be understood to be removably clamped to a trailer-frame member, such as the elongate central towing tongue of a boat trailer. The head ends of cylinders 28–30 are pivotally connected to beam 100 at equal and opposite transverse offsets from bracket 101. The piston-rod ends of link means 28–30 are removably and pivotally connected to a cross-beam 102 having a central aperture 103 for connection to the towing vehicle, as at the frame member 13 and secured by the bolt of hitch ball 12; heavy connected and opposed arrows 104 at both ends of beam 102 will be understood to suggest further removable clamping of beam 102 to the frame of the towing vehicle.

As noted above, the hydraulic cylinders 28–30 of FIG. 3 are single-acting. The hydraulic supply comprises a pump 105, drawing from a sump 106; for simplicity, pump 105 is manually operated, as by reciprocating a pump handle (not shown). A valve 107 is manually positioned to supply pumped pressure fluid to a distribution valve 108, having like outlets to the tail ends of the respective cylinders at 28-30, thus enabling operation of the apparatus in the HITCH MAKE-UP mode, drawing the trailer to the precise position at which tongue-hitch connection may be made to the hitch ball 12; in its other position, valve 107 opens the supply line, allowing fluid to drain to sump 106, as for example when fully extending links 28-30 in preparation for a HITCH MAKE-UP operation. Valve 108 is shown with manually operable means 109 which, in its shifted position 109', blocks flow in the described distribution course from valve 107 to cylinders 28-30, and which at the same time establishes a single interconnection of the tail ends of cylinders 28-30 via a restrictive orifice 110; in this arrangement, the restrictive orifice will be understood to provide a sway-stabilizing or TRAVEL-Mode relationship of the parts. Finally, in a third position of the actuator 109 (e.g., 180° removed from the position shown in FIG. 3), a further shut-off is established by a valve member 111 in the orifice line, thereby locking the hydraulic fluid against any flow between cylinders 28-30; in this arrangement, valve member 111 will be understood to have established the locked-up relation of parts for a simplified BACK-UP mode relationship.

Figure 4:
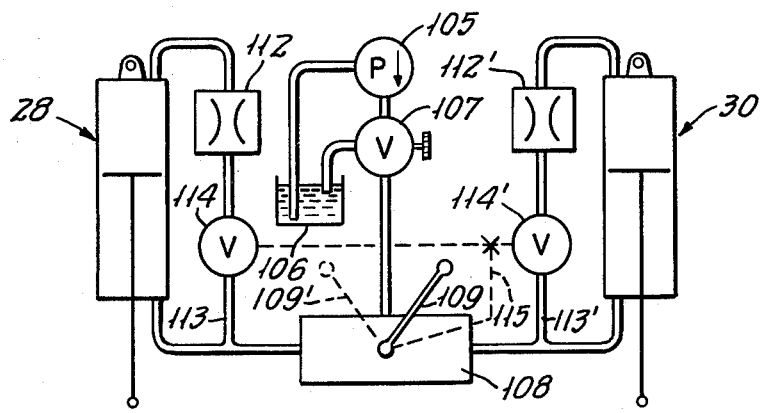

In the arrangement of FIG. 4, many of the parts will be recognized from FIG. 3, and so the same reference numbers are re-used. In particular in FIG. 4, the cylinders 28-30 are double-acting, and the restrictive-orifice function is provided separately for each of the cylinders, between the head and tail end thereof. Thus, a first such orifice 112 is in a line 113 which interconnects head and tail ends of cylinder 28, when valve 108 is actuated to the supply shut-off position (109'); at the same time a shut-off valve 114 in line 113 is actuated to open position, a synchronizing linkage to assure this relation between valves 108-114 being suggested by the broken line 115. In like fashion, a separate restrictive orifice 112' in line 113' serves to restrict flow of hydraulic fluid between head and tail ends of cylinder 30, when valve 108 is in its closed position (109') with synchronized valve 114' in its open condition. Shift of valve actuator 109 to its third position (not shown) will be understood to assure the closed condition of all valves 108-114-114'; and when valve actuator 109 is in the solid-line position shown, it will be understood that valve 108 will be open for distribution of pumped fluid to both cylinders, while concurrent closure of both valves 114-114' assures that such distribution will be made only to tail ends of cylinders 28-30, this being the HITCH MAKE-UP mode for operation of FIG. 4. It will further be understood that for the HITCH MAKE-UP mode, wherein the tail ends of cylinders 28-30 are driven in the link-shortening direction, the respective valve means 114-114' include provision (not shown) for venting to the sump 106 such fluid as is expelled from the non-driven (head) ends of cylinders 28-30, during such tail-end driving of cylinders 28-30.

Figure 5:
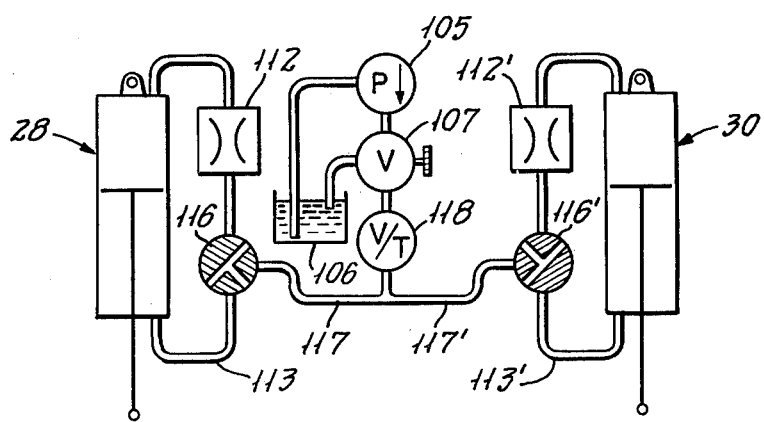

In the arrangement of FIG. 5, corresponding reference numbers are again re-used, it being noted that cylinders 28-30 are again double-acting. The difference in FIG. 5 is that manually operable three-way valves 116-116' are positioned in the restrictive cylinder-shunting lines 113-113', and distribution lines 117-117' to the respective valves 116-116' are served by a pumped-fluid supply line which includes a manually operable throttle valve 118. Valve 116 has four positions, namely: (1) closing line 113 (as shown); (2) fully opening line 113, solely for the restrictive orifice shunting function at cylinder 28; (3) connecting supply line 117 to the head end of cylinder 28; and (4) connecting supply line 117 to the tail end of cylinder 28. The four positions of valve 116' correspond to those of valve 116, in the context of cylinder 30, its supply line 117' and its restrictive orifice 112'. It will be seen that the circuit of FIG. 5 will perform the functions of FIG. 4, except that FIG. 5 additionally permits the supply of pressure fluid to the head end of one cylinder 28 (30) while also supplying pressure fluid to the tail end of the other cylinder; this will be recognized as providing the maneuvering feature of the BACK-UP mode, and it will be understood that valves 115-116 both include provision (not shown) for venting displaced hydraulic fluid to sump, from whatever may be the non-driven end of a particular cylinder. The throttle valve 118 will further be understood to permit close control of the rate at which steered maneuvering is accomplished via the described valving, whichever direction of steering maneuver is selected.

It will be seen that the described embodiments meet the stated objects, with varying degrees of complexity, depending upon the number of desired selectively available relationships, and depending on whether or not remotely controlled operation is desired. Of course, even if all hydraulic components are carried by the towed vehicle, as in FIGS. 3, 4, and 5, the controls may still be remotely operated by suitable solenoid and motor-driven elements, having detachable flexible connection to the towing vehicle, as will be understood.

While the invention has been described in detail for the forms shown, it will be understood that modifications may be made without departing from the scope of the invention.

What is claimed is:

1. Trailer-coupling mechanism including first elements for application to towing-tongue or the like rigid structure of a towed vehicle, said first elements comprising first and second variably elongate link means including coacting piston and cylinder members for connecting transversely spaced parts of said towed-vehicle structure to transversely spaced parts of towing-vehicle structure, and pressure-fluid supply means including detachable-connection means for each of plural pressure-fluid supply lines independently connected to the respective end parts of the cylinder members of both said link means; and second elements including pressure-fluid control means for application to a towing vehicle, said pressure-fluid control means including detachable-connection means having detachable connection to the towed-vehicle detachable-connection means and providing independent control from the towing vehicle to the respective fluid-supply lines on the towed vehicle, said control means including a selectively operable pressure-fluid connection including a restrictive orifice and operative between two different end parts of said cylinder members.

2. The trailer-coupling mechanism of claim 1, in which the piston and cylinder members of both said link means are double-acting, whereby said piston and cylinder members have a first corresponding pair of end parts for connection to the towing-vehicle structure and a second corresponding pair of end parts for connection to the towed-vehicle structure, said selectively operable connection being between the end parts of one of said pairs.

3. The trailer-coupling mechanism of claim 2, in which said control means includes a second selectively operable pressure-fluid connection including a restrictive orifice and establishing a pressure-fluid connection between the end parts of the other of said pairs.

4. The trailer-coupling mechanism of claim 3, in which the same selectively operable means is operative to concurrently establish both said orifice connections.

5. The trailer-coupling mecahnism of claim 3, in which the same selectively operable means is operative in a first selectively operated control condition to establish both said orifice connections and is also operative in a second selectively operated control condition to establish a shut-off of fluid flow to or from the end parts of one of said pairs.

6. The trailer-coupling mechanism of claim 1, in which said control means includes a selectively operable shut-off operative to block fluid flow to or from at least one of the end parts of one of said cylinder means.

7. Trailer-coupling mechanism according to claim 1, in which the piston and cylinder members of both said link means are double-acting, said selectively operable connection being between opposite end parts of the cylinder element of one of said link means.

8. Trailer-coupling mechanism according to claim 7, in which said control means includes a second selectively operable pressure-fluid connection including a restrictive orifice and establishing a pressure-fluid connection between opposite end parts of the cylinder member of the other of said link means.

9. Trailer-coupling mechanism according to claim 8, in which the same selectively operable means is operative to concurrently establish both said orifice connections.

10. Trailer-coupling mechanism according to claim 8, in which the same selectively operable means is operative in a first selectively operated control condition to establish both said orifice connections and is also operative in a second selectively operated control connection to establish a shut-off of fluid flow to or from at least one of the end parts of the cylinder member of each of said link means.

11. Trailer-coupling mechanism according to claim 1, in which said second elements include rigid bar means for central transverse mounting to the rear part of the frame of the towing vehicle, and a pair of transversely spaced towed-vehicle connection elements on said bar means for connection to the respective towing-vehicle connection ends of said first and second link means.

12. Trailer-coupling mechanism according to claim 11, and including a tow-hitch member centrally mounted on said bar means between the connection elements of said pair and providing a tow point for connection to the towed vehicle.

13. Trailer-coupling mechanism according to claim 1, in which said second elements include rigid bar means for central transverse mounting to the rear part of the frame of the towing vehicle, and means including connections on said bar means for establishing at selectively available and differently transversely spaced connection points the towing-vehicle connection of the respective towing-vehicle connection ends of said first and second link means.

14. Trailer-coupling mechanism including first elements for application to towing-tongue or the like rigid structure of a towed vehicle, said rigid structure having a towing connection for connection to a towed vehicle, said first elements comprising variably elongate link means including coacting piston and cylinder means for connecting towed-vehicle structure to towing-vehicle structure between parts transversly spaced from the towing connection to the towing vehicle, and pressure-fluid supply means including detachable-connection means for each of plural pressure-fluid supply lines independently connected to the respective end parts of said cylinder means; and second elements including pressure-fluid control means for application to a towing vehicle, said pressure-fluid control means including detachable-connection means having detachable connection to the towed-vehicle detachable-connection means and providing independent control from the towing vehicle to the respective fluid-supply lines on the towed vehicle, said control means including a selectively operable pressure-fluid connection including a restrictive orifice and operative between two different end parts of said cylinder means.

* * * * *